US005742417A

United States Patent [19]
Whitney

[11] Patent Number: 5,742,417
[45] Date of Patent: *Apr. 21, 1998

[54] DATA ACCESS ARRANGEMENT HAVING IMPROVED TRANSMIT-RECEIVE SEPARATION

[75] Inventor: David Whitney, San Jose, Calif.

[73] Assignee: Siemens Components, Inc., Cupertino, Calif.

[*] Notice: The term of this patent shall not extend beyond the expiration date of Pat. No. 5,579,144.

[21] Appl. No.: 706,858

[22] Filed: Sep. 3, 1996

Related U.S. Application Data

[62] Division of Ser. No. 497,580, Jun. 30, 1995, Pat. No. 5,579,144.

[51] Int. Cl.$^6$ ............................................. H04B 10/00
[52] U.S. Cl. .......................... 359/153; 359/162; 379/398; 379/402
[58] Field of Search ............................ 359/153, 187, 359/188, 194, 195, 162; 379/398, 399, 402, 412

[56] References Cited

U.S. PATENT DOCUMENTS

| | | | |
|---|---|---|---|
| 4,417,099 | 11/1983 | Pierce | 375/8 |
| 4,638,167 | 1/1987 | Leseure et al. | 379/398 |
| 5,245,654 | 9/1993 | Wilkinson et al. | 379/405 |
| 5,465,298 | 11/1995 | Wilkison et al. | 379/406 |
| 5,506,900 | 4/1996 | Fritz | 379/402 |
| 5,579,144 | 11/1996 | Whitney | 359/153 |

Primary Examiner—Wellington Chin
Assistant Examiner—Rafael Bacares

[57] ABSTRACT

A data access arrangement (DAA) having a transhybrid circuit for separating a transmit signal from a received signal by providing a transmit cancellation signal to the inverting input of a servo-feedback differential amplifier on the receive channel of the DAA. The cancellation signal is provided by a photodiode optically coupleable with a light emitting diode within a optical isolator on the transmission channel of the DAA. The gain of the cancellation signal can be independently controlled.

1 Claim, 1 Drawing Sheet

DATA ACCESS ARRANGEMENT HAVING IMPROVED TRANSMIT-RECEIVE SEPARATION

This is a divisional of application Ser. No. 08/497,580 filed Jun. 30, 1995 now U.S. Pat. No. 5,599,144.

FIELD OF THE INVENTION

The present invention generally relates to a device, known as a "data access arrangement" (or "DAA"), for coupling a data terminal equipment ("DTE") with a telephone line. In particular, the present invention relates to an optical data access arrangement (DAA) including an optically isolated transhybrid having improved transmit-receive separation.

BACKGROUND OF THE INVENTION

Telephone signals are provided to subscribers through the public switched telephone network ("PSTN" or "the network"). The subscriber portion of the network has two wires known as "tip" and "ring". These wires carry information being transferred to and from the subscribers, as well as control signals, such as a connection request (or "ring") signal. The bandwidth of the network is between about 300 Hz to 3.4 KHz. Accordingly, any data terminal equipment (DTE), such as data modems, facsimile machines, (non-cellular) portable telephones, speaker phones, and message answering machines, for example, must be compatible with the network (PSTN) to function properly. To this end, data access arrangements (DAAs) provide an interface to bridge any inconsistencies between the data terminal equipment (DTE) and the network (PSTN).

Furthermore, the network (PSTN) must be protected from damage due to, for example, faulty data terminal equipment (DTE) or inadvertent shorts through the data terminal equipment (DTE) to its power line. Indeed, the United States Federal Communications Commission ("FCC") requires a 1500 volt isolation between the data terminal equipment (DTE) and the public switched telephone network (PSTN). In the past, data access arrangements (DAAs) used transformers to provide such electrical isolation. Although transformers adequately isolated the network from the DTE and although transformers permitted bi-directional signal transfer (i.e., an AC signal on a primary would induce a signal on the secondary and an AC signal on the secondary would induce a signal on the primary), they have several limitations. First, transformers are costly relative to solid state devices. Second, transformers are relatively large and heavy. Thus, transformers are not well-suited for applications requiring the interface to have minimal volume and weight, e.g., portable DTEs such as portable personal computers, portable facsimile machines, and portable modems. Therefore, an inexpensive, small, and lightweight data access arrangement (DAA) is needed.

Moreover, the data terminal equipment (DTE) are typically four wire devices, having separate transmit and receive wire pairs. Accordingly, the data access arrangements (DAAs) must include a duplexing circuit, or transhybrid, to bridge the two-wire network and the four-wire data terminal equipment (DTE). Since data can be transmitted and received simultaneously, the transhybrid must separate the transmit and receive signal paths. This separation is achieved by suppressing the level of the transmit signal at the output of the transhybrid, and inverting this signal to form a transmit cancellation signal. This signal is added to the receive input of the transhybrid, thereby separating the transmitted signal from the received signal. In known DAAs, the transmit cancellation signal is derived from the output of the line drive circuit. Unfortunately, the cancellation signal cannot be independently controlled. Thus, a DAA having an improved transmit-receiver separation circuit is needed.

The data access arrangement (DAA) should ideally have a flat frequency response, a constant group delay, extremely small amplitude and frequency distortion, and should match the impedance of the network line.

SUMMARY OF THE INVENTION

Briefly, the present invention provides a data access arrangement that includes a transhybrid which produces a transmit cancellation signal independent of the line drive circuit to achieve transmit-receive separation. Thus, for example, the gain of the cancellation signal produced by the transhybrid may be independently controlled.

BRIEF DESCRIPTION OF THE DRAWINGS

For a better understanding of the invention, reference is made to the following description of an exemplary embodiment thereof, and to the accompanying drawings, wherein.

DETAILED DESCRIPTION

Figure 1:
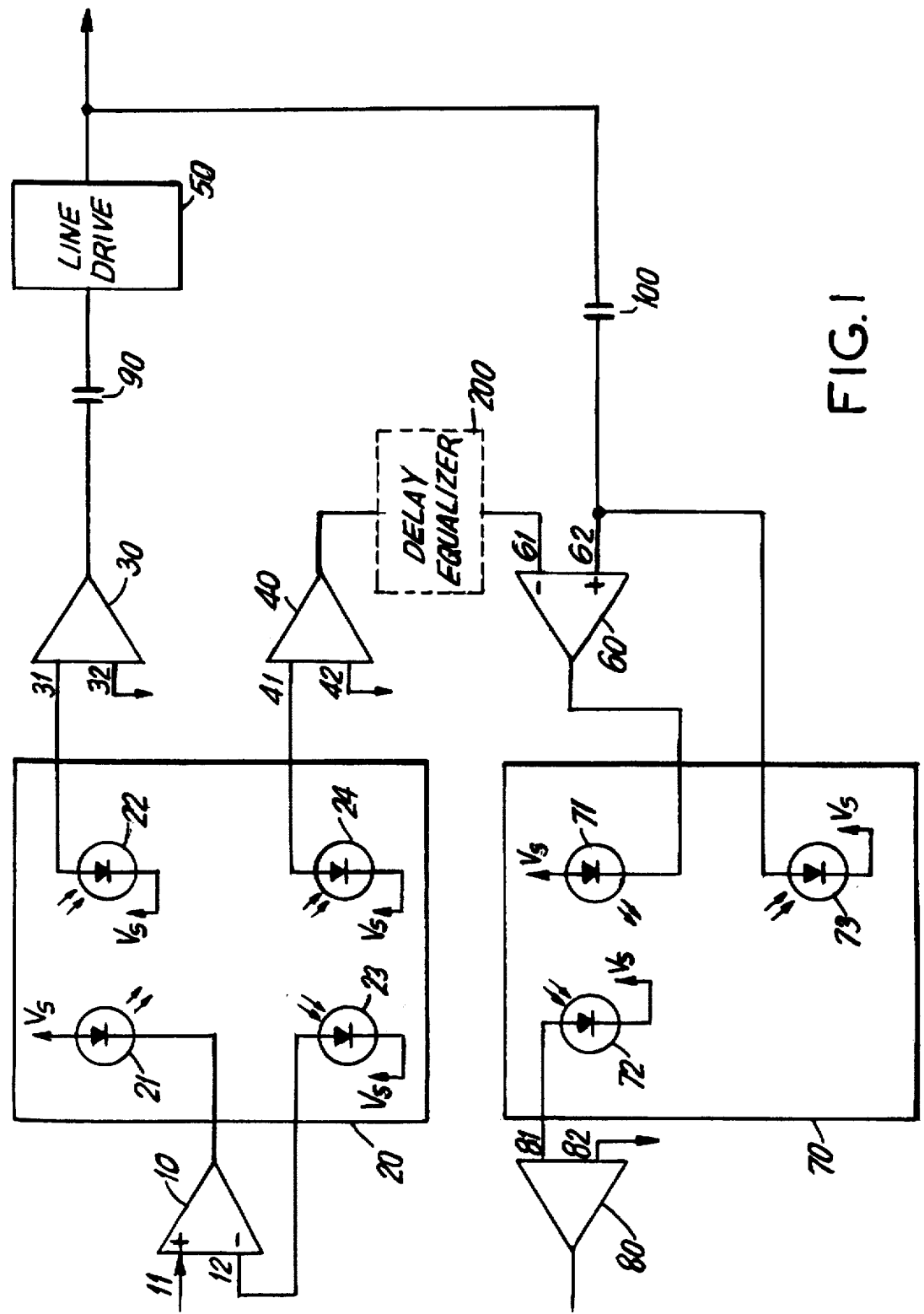
FIG. 1 is a block schematic of a data access arrangement (DAA) provided with a transmit-receive separation circuit constructed in accordance with the present invention.

FIG. 1 is a block schematic of a data access arrangement (DAA) of the present invention. Data to be transmitted from the data terminal equipment (DTE) is provided to a first (non-inverting) input 11 of a first differential (or servo feedback) amplifier 10. The first differential amplifier 10 produces an output based on a difference between the data provided to its first (non-inverting) input 11 and a feedback signal provided to its second (inverting) input 12. The output of the first differential amplifier 10 is coupled with the cathode of a light emitting diode (or "LED") 21. The anode of the LED 21 is coupled with a supply voltage $V_s$. Thus, the voltage provided at the output of the first differential amplifier 10 controls the amount of current passing through the LED 21. Alternatively, the output of the first differential amplifier can be coupled with the anode of the LED 21 and the LED 21 can have its cathode coupled with ground, such that the first differential amplifier 10 sources the current through the LED 21. Accordingly, the LED 21 emits light having an intensity based on the output of the first differential amplifier 10. However, since the current-voltage characteristic of LEDs is non-linear, the output of the LED 21 is non-linear with respect to its input.

The LED 21 is part of a first optical isolating circuit 20. The first optical isolating circuit 20 also includes a first photodiode 22, a second photodiode 23, and a third photo diode 24, each of which is optically coupleable with the LED 21. Thus, when the LED 21 emits light based on the signal output by the first differential amplifier 10, each of the first, second, and third photodiodes (22, 23, and 24, respectively) produce a current based on the intensity of the light emitted by the LED 21. In the embodiment illustrated in the FIGURE, the photodiodes 22–24 are reverse biased depletion layer diodes, operating below the breakdown voltage. However, other types of photodiodes and biasing may be used in alternative embodiments which will be apparent to those skilled in the art. The current produced by the second photodiode 23 is fed back to the second (inverting) input 12 of the first differential amplifier 10. The feedback current produced by the second photodiode 23 facilitates linear operation of the first optically isolating circuit 20.

The current produced by the second photo diode 22 is provided to a first input 31 of a first operational amplifier (output opamp) 30. The output of the first opamp 30 is provided to a line drive circuit 50, via a first capacitor 90. The first capacitor 90 acts as a high pass filter, blocking the DC component of the output. The line drive circuit 50, which drives a local telephone line of the public switched telephone network (PSTN), may be a conventional line drive circuit. The line drive circuit 50 may include an impedance buffer, such as a bipolar transistor, for example. A biasing network, such as a voltage divider network for example, may be provided at the gate of the bipolar transistor such that the bipolar transistor operates in its most linear region.

The current produced by the third photodiode 24 is provided to a first input 41 of a second operational amplifier (opamp) 40. The output of the second opamp 40 is provided to a first (inverting) input 61 of a second differential (or servo feedback) amplifier 60. The gain of the second opamp 40 can be appropriately adjusted to amplify the transmit cancellation signal properly. The second (non-inverting) input 62 of the second differential amplifier 60 is coupled, via a second capacitor 100 to the local public switched telephone network (PSTN). The second capacitor 100 acts as a high pass filter, blocking the DC component of the signal.

The output of the second differential amplifier 60 is provided to the cathode of an LED 71 which has an anode coupled with a supply voltage Vs. Thus, the output voltage provided by the second differential amplifier 60 controls the amount of current flowing through the LED 71. As discussed above, the second differential amplifier 60 may be coupled with the anode of the LED 71 so that it sources the current through the LED 71. The LED 71 is included in a second optical isolation circuit 70. The second optical isolation circuit 70 also includes a first photodiode 72 and a second photodiode 73, each of which are optically coupleable to the LED 71. When the LED 71 emits light, a current based on the intensity of the emitted light is produced by the photodiode 72. The anode of the photodiode 72 is coupled with a first input 81 of a third operational amplifier (opamp) 80. The output of the third opamp 80 is provided to a receiver.

The second photodiode 73 also produces a current based on the intensity of the light emitted by the LED 71. The anode of the second photodiode is coupled with the second (non-inverting) input 62 of the second difference (servo) amplifier 60, thereby providing a feedback signal to facilitate linear operation of the second optically isolating circuit 70.

As discussed above, in the embodiment illustrated in the FIGURE, the photodiodes 72 and 73 are reverse biased depletion layer diodes, operating below the breakdown voltage. However, other types of photodiodes and biasing may be used in alternative embodiments which will be apparent to those skilled in the art.

As shown in phantom in the FIGURE, a delay equalizer 200 may be provided between the second opamp 40 and the third opamp 60 for equalizing the transmit cancellation signal with the transmitted signal, i.e., for delaying the transmit cancellation signal such that it is synchronized with the transmitted signal.

The embodiments described herein are merely illustrative of the principles of the present invention. Various modifications may be made thereto by persons ordinarily skilled in the art, without departing from the scope or spirit of the invention.

What is claimed is:

1. An interface circuit having a first port and a second port, the first port having a transmit line and a separate receive line, the second port having a bidirectional line, the interface circuit electrically isolating the first port and the second port, the interface circuit comprising:

a first optical isolation circuit electrically coupled to the transmit line, the first optical isolation circuit comprising:
   a first light source electrically coupled to the transmit line, the first light source generating a first illumination signal corresponding to a signal on the transmit line; and
   a first light detector optically coupled to the first light source for receiving the first illumination signal and generating a corresponding electrical signal;

a line driver electrically coupled to the first light detector, the line driver driving the bidirectional line in response to the electrical signal generated by the first light detector;

a differentiator having a first input, a second input and an output, the first input of the differentiator being electrically coupled to the bidirectional line;

a second light detector optically coupled to the first light source for receiving the first illumination signal and generating a corresponding electrical signal, the second light detector being electrically coupled to the second input of the differentiator; and a second optical isolation circuit electrically coupled to the differentiator output, the second optical isolation circuit comprising:
   a second light source electrically coupled to the differentiator output, the second light source generating a second illumination signal corresponding to an electrical signal generated at the differentiator output; and
   a third light detector optically coupled to the second light source for detecting the second illumination signal and generating a corresponding electrical signal, the third light detector being electrically coupled to the receive line.

* * * * *